United States Patent [19]
Albano

[11] 4,235,565
[45] Nov. 25, 1980

[54] PRECISE DOWEL JOINT WOODWORKING DEVICE

[76] Inventor: Mathew R. Albano, 59 Marshall Hill Rd., West Milford, N.J. 07480

[21] Appl. No.: 32,087

[22] Filed: Apr. 23, 1979

[51] Int. Cl.³ .............................................. B23B 41/00
[52] U.S. Cl. ..................................... 408/99; 144/104; 408/109; 408/136; 408/712
[58] Field of Search ................. 408/136, 712, 109, 88, 408/91, 99, 107, 108; 144/104

[56] References Cited

U.S. PATENT DOCUMENTS

| | | | |
|---|---|---|---|
| 952,623 | 3/1910 | Merrill | 408/107 X |
| 2,768,663 | 10/1956 | Jones | 408/712 X |
| 3,362,447 | 1/1968 | Elder, Jr. | 408/109 |
| 3,890,058 | 6/1975 | Self et al. | 408/712 X |
| 4,057,358 | 11/1977 | Young | 408/712 X |

Primary Examiner—Willie G. Abercrombie
Attorney, Agent, or Firm—Haseltine and Lake

[57] ABSTRACT

The present invention discloses a portable precise dowel joint woodworking device for drilling holes in a woodwork piece. The device comprises a horizontally slidable power drill mounted on a base, a handle pivotably attached to a drill, a hold-down lever hinged to a hold-down support mounted on the base to support the workpiece in a vertical attitude, a vertically adjustable work table upon which the workpiece can rest, and a depth-stop bolt attached to a sliding bar support for adjusting the depth of the hole to be cut into the workpiece.

1 Claim, 7 Drawing Figures

PRECISE DOWEL JOINT WOODWORKING DEVICE

BACKGROUND OF THE INVENTION

The present invention relates to a hole drilling device and, more particularly, a device having application in the area of woodworking in which precise dowel joints are of prime importance.

Power drills are very old and usually are in the form of a drill press or electric hand drill. Various patents in the prior art relate to a portable drill and the attachments associated therewith. Some examples of the state of the art in this area appear in U.S. Pat. Nos. 1,922,532; 2,625,063; 2,709,380; 2,737,065; 2,973,673; 3,060,769; and 3,890,058.

The basic shortcoming in designs of the prior art have related to an absence of a device capable of providing precise dowel joints in woodworking operations. Precut and machined dowels are available in the market; however, due to the unavailability of an economical machine for the making of precise dowel joints in the area of woodworking, most of the people in their houses, and carpenters in their wood shops avoid the use of making dowel joints or, alternatively, the use of conventional drills. The present device is intended to change the above in that it will serve to drill perfect dowel joints in a matter of seconds. Futher, the use of the present device is practical in use for a large sized workpiece.

It is noteworthy as to how few efforts in the prior art in attaining the above have been successful. Accordingly, it is necessary, in order to attain the most beneficial function, to attain a device capable of providing precise dowel joints, even if operated by an unskilled person in the woodworking craft. Accordingly, the present invention is intended as a solution to the above long-felt need in the art.

SUMMARY OF THE INVENTION

The present invention discloses a portable precise dowel joint woodworking device for drilling perfect holes in a wood piece. Said device comprises a base, a horizontally slidable power drill mounted on the base; a handle lever pivotably attached to the power drill to move the drill horizontally in the direction of the workpiece; a hold-down lever hinged to a hold-down support mounted on the base to support the workpiece vertically; a vertically adjustable worktable upon which the workpiece can be adjusted for drilling a hole thereinto; and a depth stop bolt attached to a sliding bar support for adjusting the depth of the hole to be cut into the workpiece. The worktable can be adjusted either by adding adjusting shims in case of a light duty device applicable for household use or by a mechanism including a pair of jaws securely attached with the base and the worktable and coupled with a handle, which upon turning, can open or close the jaws, thereby increasing or decreasing the height of the worktable. This mode is particularly applicable to commercial use or for heavy duty applications.

It is an object of the present invention to provide a device capable of providing perfect holes into woodpieces for making precise dowel joints.

It is another object to provide an economical and cost-effective machine for creating precise dowel joints in woodworking.

It is a further object of the present invention to provide a device that can be operated by any unskilled person in the woodworking craft.

DETAILED DESCRIPTION OF THE INVENTION

Figure 1:
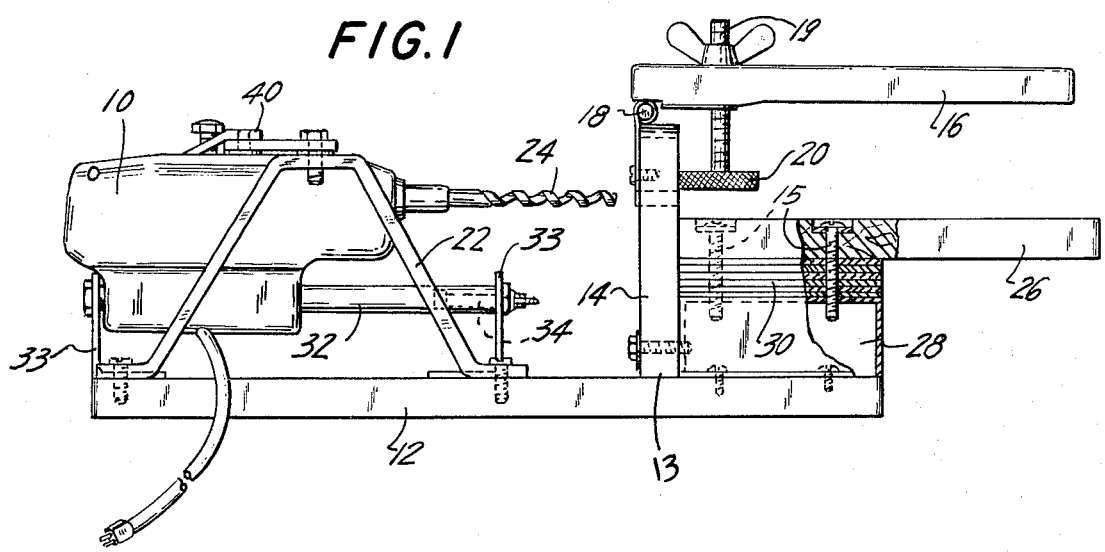
FIG. 1 is a front perspective view of the present invention.

A general understanding of the role of the present invention may be obtained with reference to FIG. 1. In said figure there is illustrated, in common form, an electric drill 10 mounted upon a base 12. A vertical support 13 for hold-down 14 is secured firmly upon the base 12 and a lever 16 vertically supporting a workpiece (not shown) is hinged (via hinge 18) to the support 13 for hold-down 14.

Figure 4:
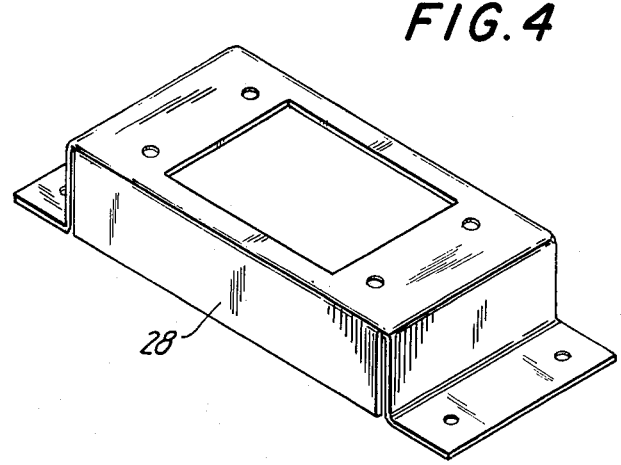
FIG. 4 is a detailed view of the worktable mounting bracket.

A height adjusting screw 19 for a vertical support of the workpiece passes through the lever 16 and it has a rubber pad 20 at one end which enables a firm contact with the workpiece and, thereby, does not scratch or damage either side of the workpiece. A lever support 22, usually of V-shape, is firmly secured on one side of the power drill 10. A drill bit 24 of varying diameter and length can be inserted in the power drill. A worktable 26 is mounted with a mounting bracket 28 such that it can be adjusted vertically by adding worktable adjusting shims 30. The shims 30 may be made of wood or metal and of varying thicknesses that can be added to adjust the height of the worktable as may be required. A detailed view of the worktable mounting bracket 28 can be seen in FIG. 4.

Figure 2:
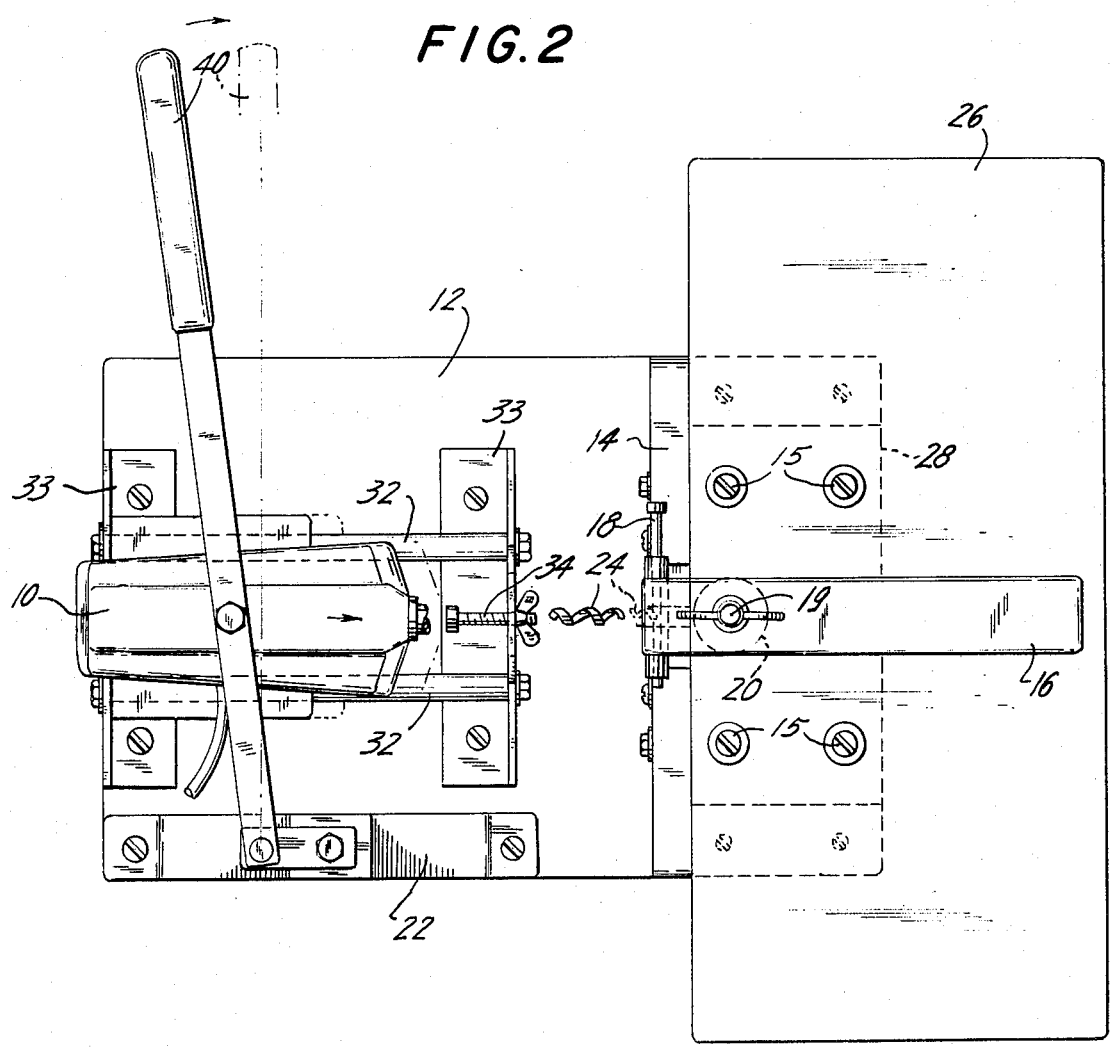
FIG. 2 is a plan view of the above.
Figure 3:
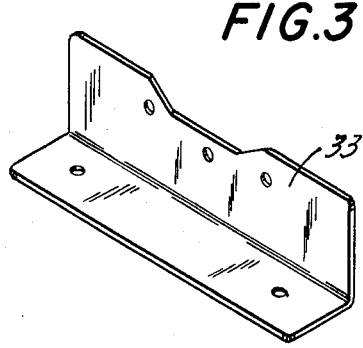
FIG. 3 is a cross-section of the sliding bar support.
Figure 7:
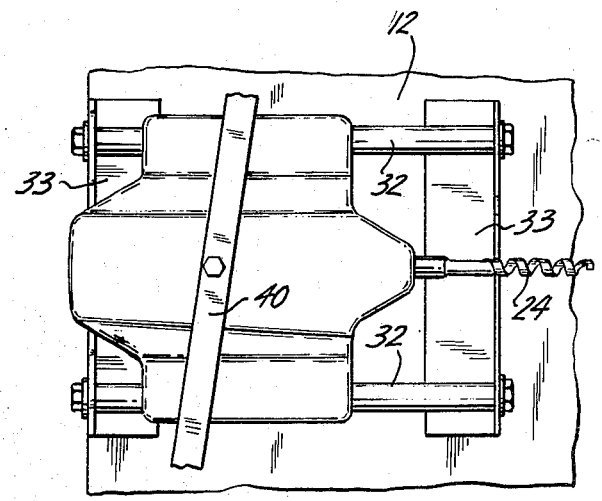
FIG. 7 is a detailed view of a heavy-duty model in which the sliding bars are on the side of a power drill.

With reference to FIG. 2, it is clearly seen that the drill 10 is slidable horizontally between sliding bars 32 towards the workpiece resting upon the adjustable worktable 26. Sliding bars 32 are proximately positioned underneath the power drill in case of a light duty model having application in houses or, alternatively, secured on the opposite sides of the power drill in case of a heavy duty model having application for commercial use, as is illustrated in FIG. 7. Sliding bars 32 are supported firmly upon the base 12 by bolting a sliding bar support 33 on the opposite side of the drill 10. The cross-section of the sliding bar support 33 can be viewed in FIG. 3. A depth stop bolt 34 attached to the sliding bar support 33 controls the depth of the hole to be cut in the workpiece, as it allows the power drill to slide horizontally up to a particular length so that drill bit 24 may cut the hole to a predetermined depth. A handle lever 40 is pivotably attached to the power drill and fixedly attached to the base 12 so that by moving the lever 40 in the direction of the workpiece, the drill may move horizontally in the same direction.

Figure 5:
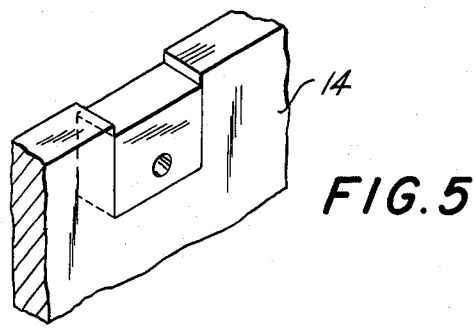
FIG. 5 is a detailed view of a block for locating a marked line on a workpiece to be drilled.

With reference to FIG. 5, a detailed view is seen of a block for locating a marked pencil line on the workpiece to be drilled. It requires simply that a matching pencil line be made on both workpieces where a dowel joint is desired. The workpiece is held firmly with a guide mark on the block and the drill is guided by a handle lever into the workpiece. The depth stop bolt 34 is adjusted so that a perfect hole of predetermined depth is achieved within seconds. It is noted that to operate this machine no particular skill is required and therefore it can be operated efficiently and successfully by anyone having absoutely no skill in the woodworking craft.

Figure 6:
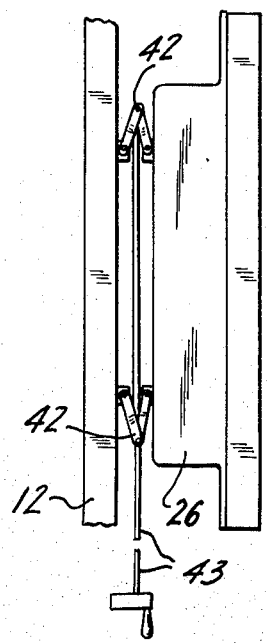
FIG. 6 is a detailed view of the adjustable worktable in relation to its base.

With reference to FIG. 6 the worktable is adjustable, alternatively, through the means for adjustment 41, the same particularly having application for heavy duty commercial use. As illustrated, said means 41 includes a pair of jaws 42 securely attached to the base 12 and the worktable 26 such that a handle 43 passes through said jaws 42 which upon turning clockwise or anti-clockwise can open or close the jaws and, thereby, the worktable supported upon the base can be adjusted vertically, depending upon the height of the worktable required for a particular use.

This present device is portable and very compact. It can be clamped or screwed to a bench for use. Specially designed wood bits cut square-bottomed holes with a shaving motion and have a center point to keep them from floating off center. They also are slightly oversized to allow for slight adjustments and glue in the joints. Pre-cut and machined dowels are available in the market and it has been found that these make very strong joints.

While there have been herein shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

What is claimed is:

1. A precise dowel joint, woodworking device, comprising:
   (a) a base;
   (b) a slidable power drill with a drill housing mounted horizontally on said base;
   (c) a V-shaped lever support securely attached with the power drill housing and the base;
   (d) a pair of sliding bars firmly supported upon the base by bolting a sliding bar support on opposite sides of the drill housing which is slidably horizontally secured between said bars;
   (e) a handle lever pivotably attached to the power drill housing and fixedly attached to the base so that by moving the handle lever in a direction of a work piece, said drill moves horizontally in same direction;
   (f) a hold-down lever hinged to a hold-down support mounted on the base to support the workpiece vertically;
   (g) a vertically adjustable worktable upon which the workpiece can be adjusted for drilling a hole thereinto; and
   (h) a depth stop bolt attached to the sliding bar support for adjusting the depth of the hole to be cut into the workpiece,
   whereby the drill is guided to drill a perfect hole at a predetermined mark on said workpiece.

* * * * *